United States Patent [19]

Takei et al.

[11] Patent Number: 4,931,878
[45] Date of Patent: Jun. 5, 1990

[54] RECORDING APPARATUS WHICH IS CAPABLE OF RECORDING TWO KINDS OF SIGNALS BY OPERATION OF A SINGLE MEMBER

[75] Inventors: Masahiro Takei; Kenichi Shinbori, both of Yokohama, Japan

[73] Assignee: Canon Kabushiki Kaisha, Tokyo, Japan

[21] Appl. No.: 188,748

[22] Filed: Apr. 29, 1988

Related U.S. Application Data

[63] Continuation of Ser. No. 828,255, Feb. 11, 1986, abandoned.

[30] Foreign Application Priority Data

Feb. 12, 1985 [JP] Japan .................................. 60-023399

[51] Int. Cl.$^5$ ............................................ H04N 5/782
[52] U.S. Cl. ..................................... 358/335; 358/341; 358/906; 358/909; 360/19.1; 360/35.1
[58] Field of Search ....................... 360/9.1, 10.1, 35.1, 360/19.1; 358/310, 335, 342, 343, 906, 909, 341

[56] References Cited

U.S. PATENT DOCUMENTS

| 4,531,161 | 7/1985 | Murakoshi | 360/35.1 X |
| 4,570,188 | 2/1986 | Ichiyanagi | 360/35.1 X |
| 4,602,296 | 7/1986 | Murakoshi | 360/35.1 X |
| 4,725,897 | 2/1988 | Konishi | 360/35.1 X |
| 4,783,707 | 11/1988 | Nemoto et al. | 358/906 X |

FOREIGN PATENT DOCUMENTS

| 57-65077 | 4/1982 | Japan | 358/310 |
| 57-65078 | 4/1982 | Japan | 358/310 |
| 58-10882 | 6/1983 | Japan | 358/909 |
| 58-159079 | 9/1983 | Japan | 358/909 |
| 58-165486 | 9/1983 | Japan | 358/909 |

Primary Examiner—Robert L. Richardson
Attorney, Agent, or Firm—Fitzpatrick, Cella, Harper & Scinto

[57] ABSTRACT

A recording apparatus which records speech and image signals on a disc and includes a memory for storing the speech signal temporarily therein. It updates the contents of the memory in accordance with a triggering signal to record the speech signal and records the contents of the memory rewritten at the occurrence of the last triggering signal.

10 Claims, 10 Drawing Sheets

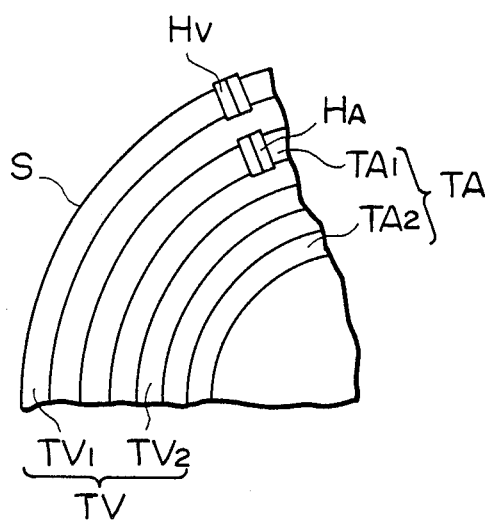
F I G. 1
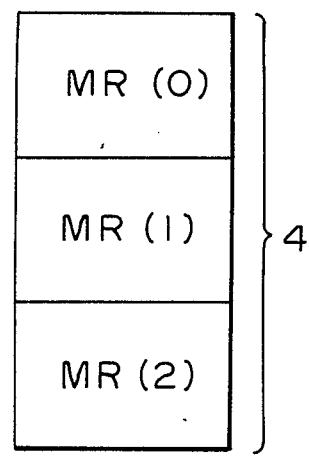
F I G. 4

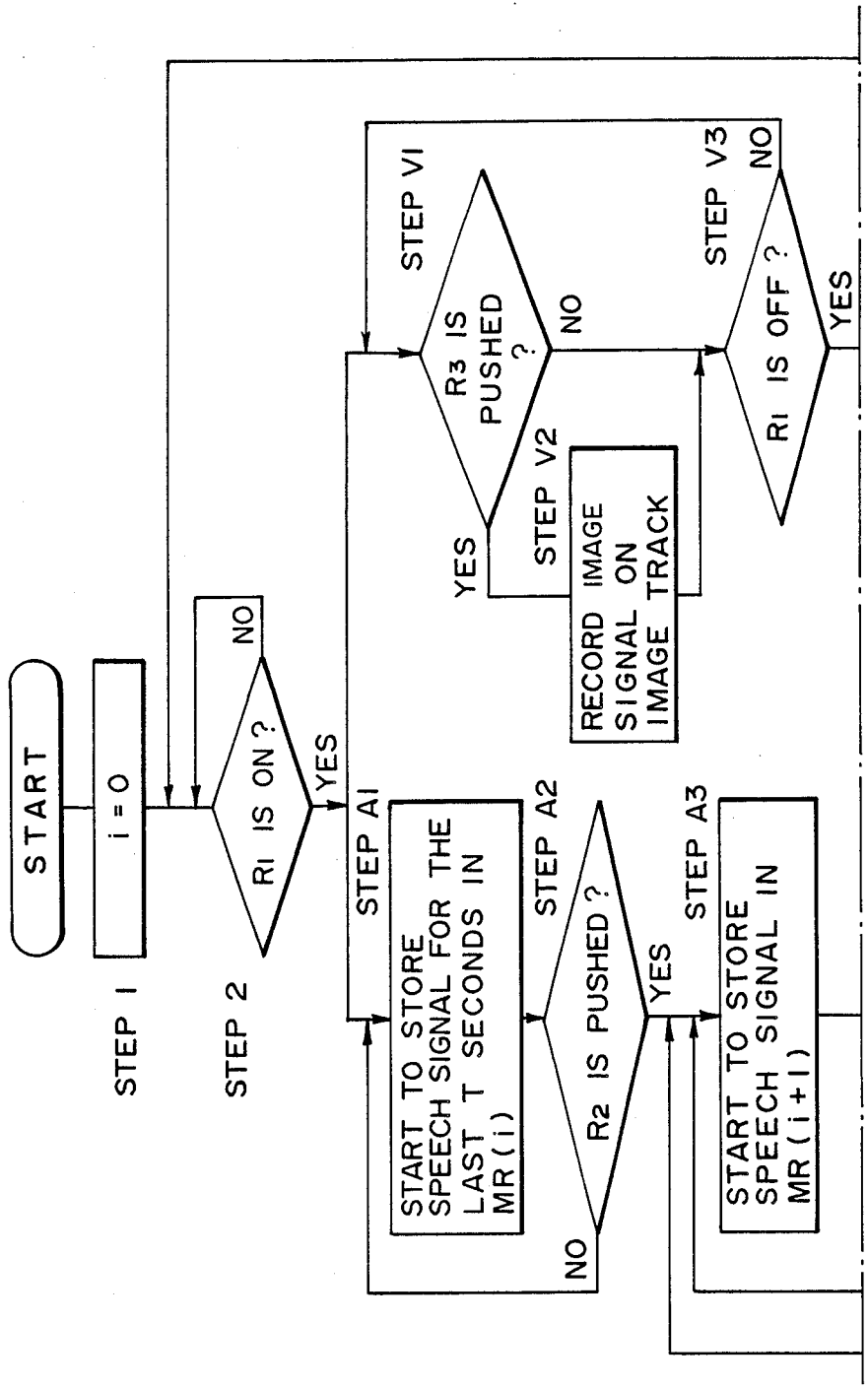

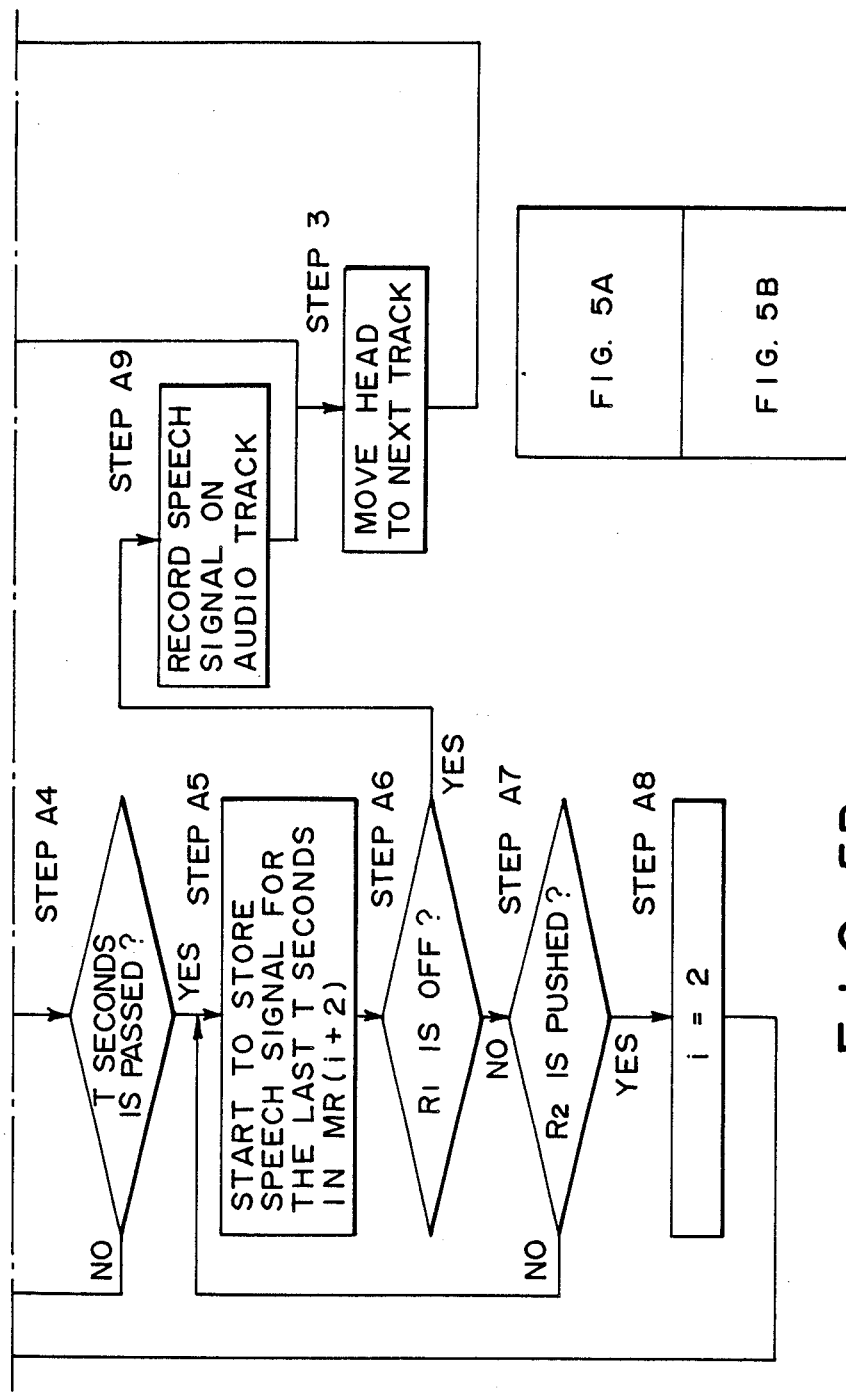

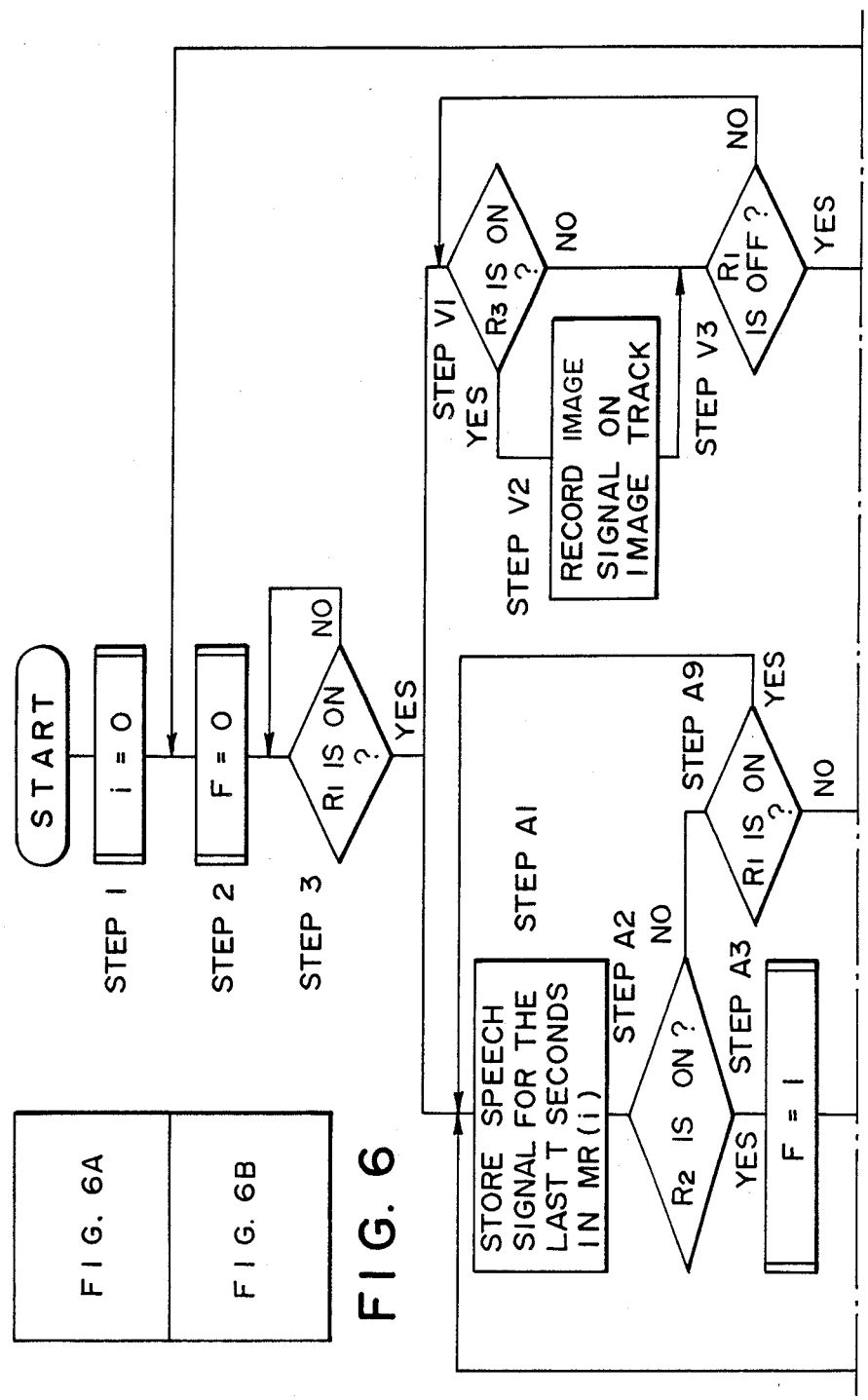

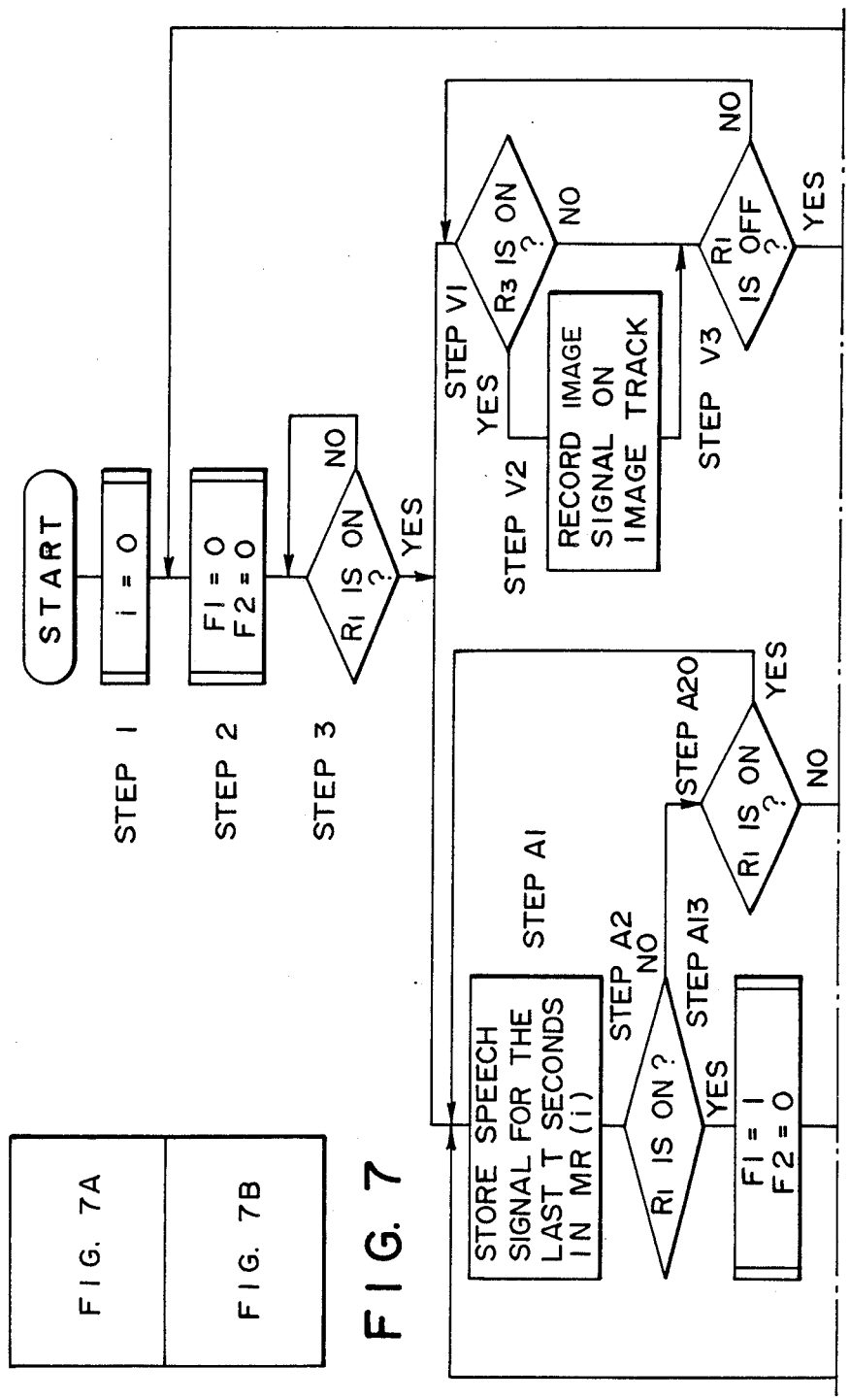

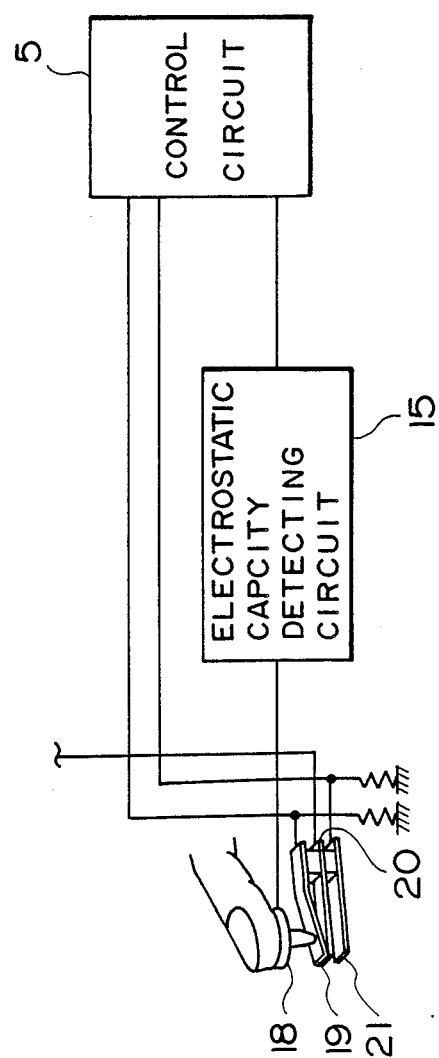
F I G. 8

RECORDING APPARATUS WHICH IS CAPABLE OF RECORDING TWO KINDS OF SIGNALS BY OPERATION OF A SINGLE MEMBER

This application is a continuation of application Ser. No. 828,255, filed Feb. 11, 1986, and now abandoned.

BACKGROUND OF THE INVENTION

1. Field of the Invention

The present invention relates to recording apparatus which are capable of recording speech signals.

2. Description of the Prior Art

One conventional recording apparatus which is capable of recording speech signals is disclosed, for example, as an electronic still camera capable of recording speech, in unexamined Japanese Patent Application No. 218004/1982 which was published Dec. 19, 1983 and corresponding to U.S. Pat. No. 4,531,161 issued on July 23, 1985.

In this camera disclosed in that application, a signal EX which is generated by a switch and by which photographing is performed, a signal RC which starts to record speech and a signal AR which records a speech signal afterwards are input to a synchronization control circuit. When the signal RC is input, an analog speech signal input via a microphone is A/D converted and then input to a shift register from which a digital speech signal is correspondingly output with a fixed delay of time. When the signal EX by which photographing is performed is generated, the speech signal delayed by the shift register is recorded on a magnetic sheet.

In accordance with the prior art, for as long the signal AR is generated by a switch (not shown), speech is recorded on tracks on the magnetic sheet.

In the above prior art, a head for recording an image on the sheet and a head for recording speech on the sheet are provided separately. An image is recorded in response to the signal EX by which photographing is performed and speech which is delayed by the shift register is recorded simultaneously. Thus speech for a fixed time before photographing is necessarily recorded in advance on the magnetic sheet. Therefore, the user must inconveniently predict the timing of photographing at all times and input the speech to the recording apparatus.

Such drawback occurs likewise in using a recording medium on which optical recording such as photomagnetic recording is performed, as is the case with the magnetic recording.

SUMMARY OF THE INVENTION

It is a first object of the present invention to eliminate the above drawbacks with the prior art.

It is a second object of the present invention to provide a recording apparatus which is capable of freely updating a speech signal to be recorded on the recording medium before being recorded.

It is a third object of the present invention to provide a recording apparatus which is capable of temporarily storing a speech signal to be stored on a recording medium and then storing the signal on the medium.

In order to attain the above objects, in an embodiment to be described hereinbelow, a recording apparatus will be illustrated which comprises a memory for storing a speech signal generated during a predetermined time, a control circuit for updating the speech signal, and means for recording the speech signal stored on the memory on a recording medium such as a magnetic sheet.

Other objects of the present invention will be apparent from the following description of embodiments.

BRIEF DESCRIPTION OF THE DRAWINGS

FIG. 1 is a plan view illustrating a head and a magnetic sheet as a recording medium for use with a recording apparatus which is a first embodiment of the present invention;

FIG. 4 illustrates the structure of the memory shown in FIG. 3;

FIGS. 5A and 5B are flowcharts showing the operation of the embodiment of FIG. 3 when they are arranged as shown in FIG. 5;

FIGS. 6A and 6B and FIGS. 7A and 7B are flowcharts which are alternative embodiment to the flowchart of FIGS. 5A and 5B when they are arranged as shown in FIGS. 6 through 7B respectively; and FIG. 8 illustrates the structure of another embodiment of button $R_1$, $R_2$, or $R_3$.

DETAILED DESCRIPTION OF THE PREFERRED EMBODIMENTS

A recording apparatus which is one embodiment of this invention will now be described with respect to FIGS. 1 and 7.

FIG. 1 illustrates a magnetic sheet S as a recording medium and magnetic heads $H_A$, $H_V$ which record information on the sheet, for use with this embodiment.

Magnetic head $H_V$ is for recording an image signal and magnetic head $H_A$ is for recording a speech signal. Heads $H_V$, $H_A$ record image and speech signals on image and speech tracks $T_V$, $T_A$, respectively; more particularly, either on image and speech tracks $T_{V1}$ and $T_{A1}$ or on image and speech tracks $T_{V2}$ and $T_{A2}$. The information on image and speech tracks $T_{V1}$, $T_{A1}$ are reproduced in one set, and the information on image and speech tracks $T_{V2}$, $T_{A2}$ are reproduced in another set.

Figure 2:
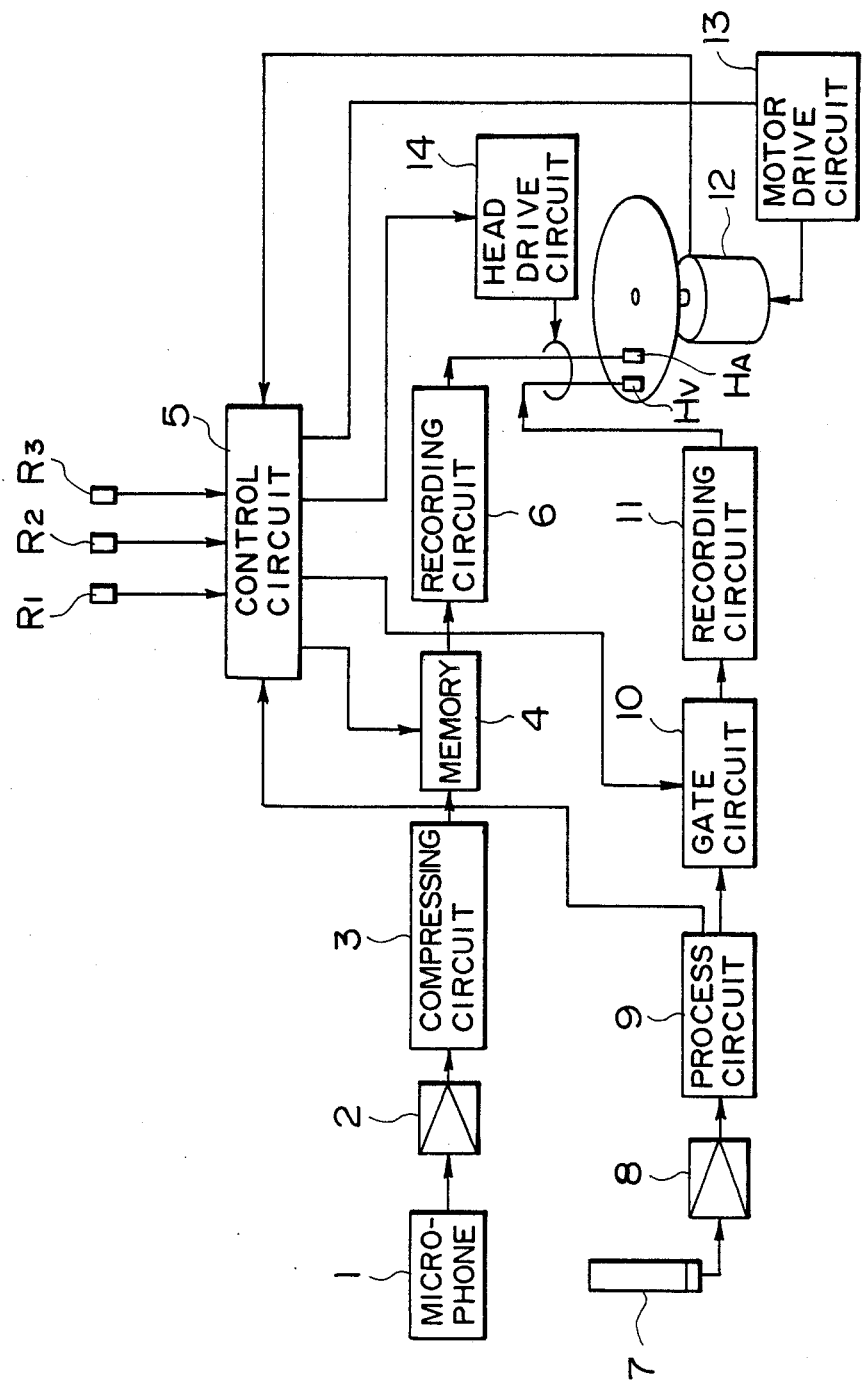
FIG. 2 is a block diagram of a schematic structure of the first embodiment of the present invention.

FIG. 2 is a block diagram showing the schematic structure of an electronic camera in the particular embodiment.

A speech signal output by a speech signal generator 1 such as a microphone is amplified by an amplifier 2 and then data compressed in a digital or analog manner, and written into a memory 4. The speech information written into memory 4 is read in accordance with a signal output by a control circuit 5 and modulated by a recording circuit 6, and the modulated signal from the recording circuit 6 is recorded on magnetic sheet S via speech recording head $H_A$.

The image signal output by an image signal generating element 7 such as a solid state camera element is amplified by an amplifier 8, subjected to predetermined signal processing by a process circuit 9 and then delivered to a gating circuit 10. This circuit 10 is controlled by a signal produced by control circuit 5 and outputs a one-screen video signal which is then recorded on magnetic sheet S via a recording circuit 11 from video recording head $H_V$. Control circuit 5 receives signals from a recording standby button $R_1$ which is pressed to start a preparatory operation for recording, a speech signal recording button $R_2$ as a speech recording means, an image recording button $R_3$ as an image recording control means, a vertical synchronization signal VD produced by process circuit 9 and a pulse signal output by a pulse generator (not shown) of a magnetic sheet drive motor 12. As will be described later, when button $R_1$ is pressed and then button $R_2$ is pressed, a speech signal written into the memory is recorded at the timing when button $R_1$ is released Control circuit 5 controls memory 4, gating circuit 10, motor drive circuit 13 which drives motor 12, and a head drive circuit 14 which drives a mechanism for moving magnetic heads $H_V$, $H_A$ in accordance with those signal inputs, as shown in the flowchart of FIG. 5.

Figure 3:
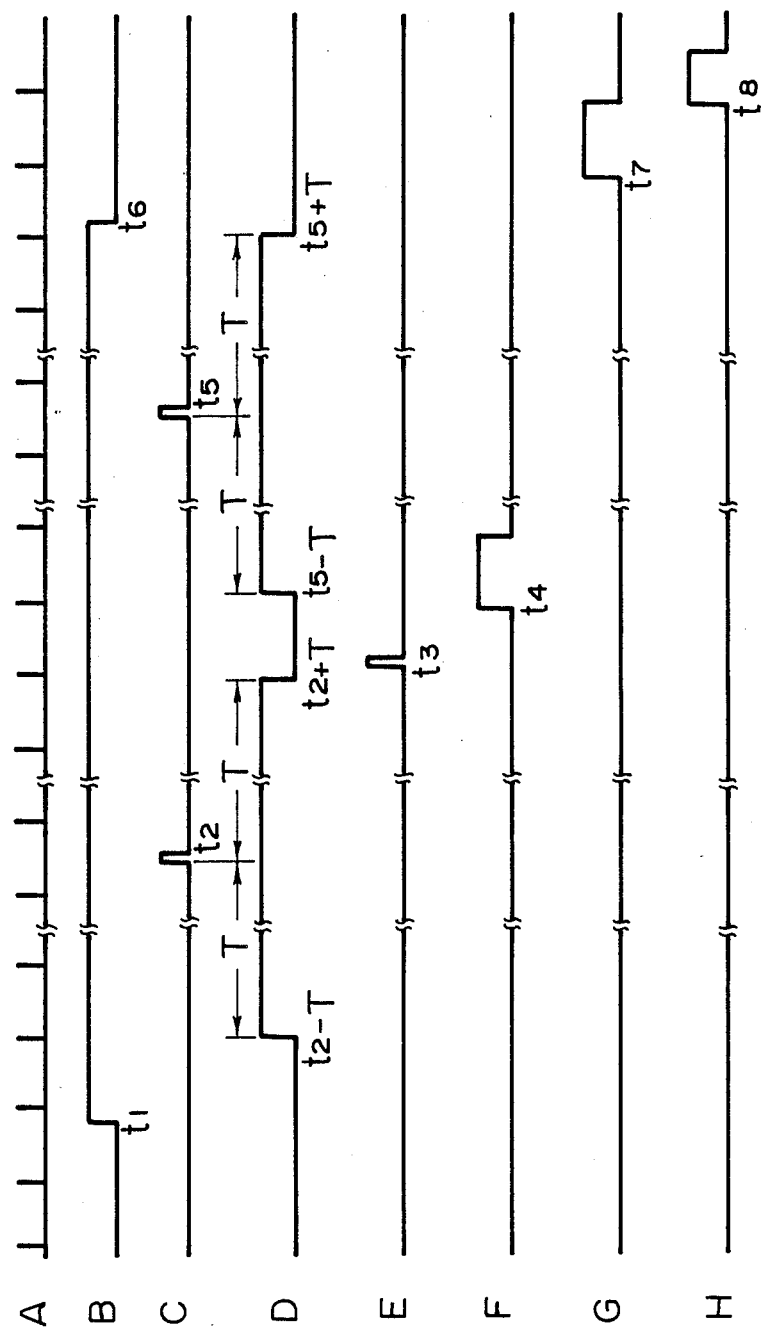
FIG. 3, consisting of A-H, is a timing chart showing the operation of the embodiment shown in FIG. 2.

FIG. 3 is a timing chart showing the operation of the embodiment. In the figure, reference character A denotes a 30 Hz pulse signal produced by the pulse generator provided on motor 12 synchronously with a rotation of magnetic sheet S. Reference character B denotes a signal produced by pressing recording standby button $R_1$, the signal being shown as being produced for the duration from a time $t_1$ to a time $t_6$ during which recording of the speech and image signals is possible. Reference character C denotes a speech recording triggering pulse output by pressing speech recording button $R_2$, the pulse being shown as being output at times $t_2$ and $t_5$ in the figure. Reference character D denotes a correspondence between time and speech signal information stored in memory 4 by the speech recording triggering pulses output at times $t_2$ and $t_5$. At the speech recording triggering pulse at time $t_2$, the speech signal information for the interval from time $(t_2-T)$ to time $(t_2+T)$ is stored. At the speech recording triggering pulse output at the time $t_5$, the speech information for the interval from a time $(t_5-T)$ to time $(t_5+T)$ is stored. In other words, a speech recording triggering pulse causes the speech signal information for the interval from T seconds both before and after the time when the speech recording triggering pulse is output to be stored. Reference character E denotes an image recording triggering pulse output by pressing image recording button $R_3$, the pulse being shown as being output at time $t_3$ here. Reference character F denotes the timing of recording image information on magnetic sheet S by the image recording triggering pulse. The image information is stored on image track $T_{V1}$ at the recording timing (time $t_4$) next to time $t_3$ when the triggering pulse is output. Reference character G denotes the timing of recording speech signal information stored in memory 4. The speech signal information stored in memory 4 is stored on speech track $T_{A1}$ at the timing ($t_7$) next to the timing (time $t_6$ here) when recording standby button $R_1$ is switched off. Reference character H denotes the timing when magnetic heads $H_A$, $H_V$ move. The timing H controls head drive circuit 13 at the time (in this case, at time $t_8$) when all the recordings have been ended by A to G, and moves magnetic heads $H_A$, $H_V$ to the next speech and image tracks $T_{A2}$, $T_{V2}$, respectively, in preparation for the next recording operations. That is, each of heads $H_A$, $H_V$ is moved by two tracks.

FIG. 4 schematically shows the structure of memory 4 used in the particular embodiment. Memory 4 is divided into three locations MR(0), MR(1), MR(2), each of which can store speech signal information for T seconds. Thus speech signal information for 2T seconds is taken from two locations. For example, information is stored in location MR(0) during the interval from time $(t_2-T)$ to time $t_2$ and in MR(1) during the interval from time $t_2$ to time $(t_2+T)$. Information is stored in MR(2) during the interval from time $(t_5-T)$ to time $t_5$. In this case, the speech information for the interval from time $(t_2-T)$ to time $t_2$ stored first in location MR(0) is newly added to the speech information for the interval from the time $t_5$ to $(t_5+T)$ by the second speech triggering pulse output at time $t_5$.

The operation of control circuit 5 which performs the above operations will now be described using a flowchart. FIGS. 5A and 5B comprise a flowchart which shows a control operation by control circuit 5. The system starts to operate in response to turning on of the power supply. At a step 1, an initial value i for designation of an location in memory 4 is set to zero. When it is determined that recording standby button $R_1$ is switched on (step 2), the following speech and image recording operations are performed. At first, the speech recording operation will be described. At a step A1, the speech signal information for the last T seconds starts to be stored in the location MR(i) (i=0 now) of memory 4. At a step A2, it is determined whether or not speech recording button R is pushed. If button R is pushed, the speech signal starts to be stored in location MR(i+1) (step A3). That is, at step A1, the speech signal for the last T seconds has been stored in location MR (i) (i=0 now) of memory 4, so that when speech recording button $R_2$ is switched on within T seconds after recording standby button $R_1$ has been switched on, the speech for the interval from the time when recording standby button $R_1$ has been switched on to the time when speech recording button $R_2$ is switched on is stored in location MR(i) of memory 4.

After speech recording button $R_2$ has been switched on, the speech signal starts to be stored in location MR(i+1) of memory 4, and the flow goes to a step A4 at which it is determined whether or not T seconds have passed after speech recording button $R_2$ have been pushed. If T seconds has passed, the speech signal information for T seconds both before and after the time when speech recording button $R_2$ has been pushed ($t_2$ in FIG. 3) has been stored. Thus the flow branches from step A4 to A5 and no further speech signal information will be stored in location MR(i+1). Thereafter, at step A5, speech signal information output successively will be stored in a location MR(i+2). The speech signal information for the last T seconds will be stored in location MR(i+2), as at step A1. At a step A6, it is determined whether or not standby button $R_1$ is off, or whether the user has tried to cause information to be stored on magnetic sheet S. If recording standby button $R_1$ is off, the speech signal information stored in locations MR(i) and MR(i+1) will be recorded on speech track $T_{V1}$ (step A9). If standby button $R_1$ is still on, it will again be determined whether or not speech recording button $R_2$ has been pushed (step A7). If speech recording button $R_2$ is not pushed, the flow will return to step A5 to repeat the operations concerned. That is, when button $R_1$ continues to be pushed, the speech signal for T seconds before button $R_1$ is released is stored in MR(i+2) of memory 4. If speech recording button $R_2$ is pushed, i.e. when the speech is re-stored, initial location designation value i will be set to 2 (step 8) and the flow will return to step A3 to repeat the operations concerned. It is assumed that the initial location designation value i has no values other than i=0, 1, 2.

The image recording operation will now be described. If recording standby button $R_1$ is determined to be pushed at step 2, it will be determined whether or not image recording button $R_3$ is pushed at step V1. If button $R_3$ is not pushed, the flow will go to step V3, and if button $R_3$ is pushed, the image information will be stored on image track $T_{V1}$ at the next recording timing at step V2, as described above, and then the flow will go to step 3. At this step, it is determined whether or not standby button $R_1$ is switched off. If button $R_1$ is switched on, the flow will return to step V1 to store the image information on the image track. If standby button $R_1$ is off, and if the speech has been recorded, as described above, magnetic heads $H_A$, $H_V$ will move to the next tracks $T_{A2}$, $T_{V2}$ after completion of the speech recording. If the speech has not been recorded, magnetic heads $H_A$, $H_V$ will move to the next tracks $T_{A2}$, $T_{V2}$.

In the above embodiment, there is no memory for storing image signal information, but only memory 4 for storing speech signal information because a memory having a huge capacity would be needed for storing image signal information. However, a memory which can store image information for a single screen, for example, one field, may be provided not only in the above embodiment, but also in other embodiments. This eliminates the need for immediate recording of image signal information on magnetic sheet S and enables an image to be retaken as needed until standby button $R_1$ is pressed finally as in the case of the speech recording. In the above embodiment, all the data stored in locations MR(1) to MR(3) of memory 4 may be recorded as speech signals on the tracks when button $R_1$ is pushed, button $R_2$ is pushed and button $R_1$ is switched off. The speech information stored not in all the locations of memory 4, but in a specified location may be stored on magnetic sheet S.

With respect to FIGS. 6A and 6B, an embodiment will be described in which the speech information stored in a specified location of memory 4 is recorded on magnetic sheet S.

Figure 6B:
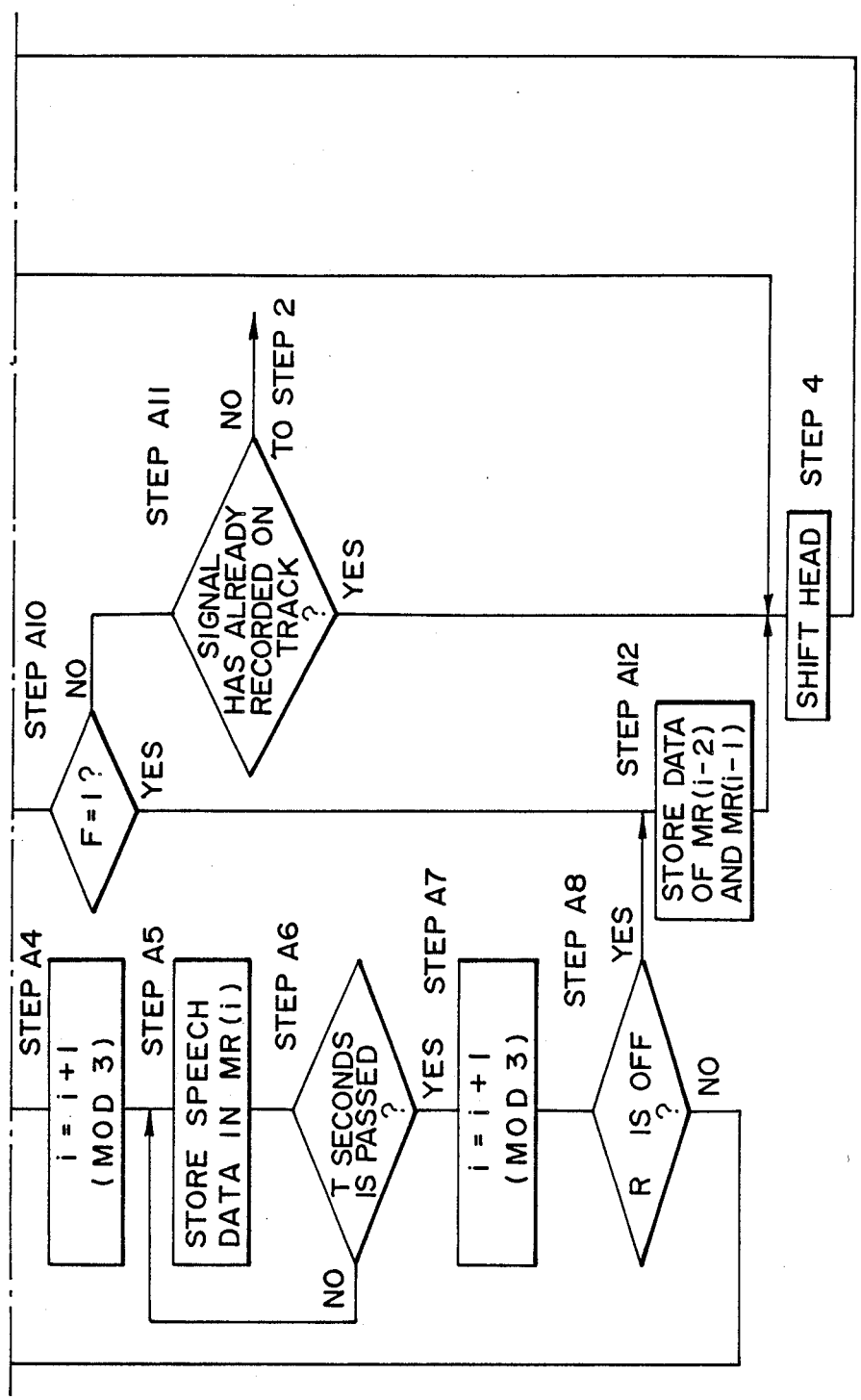

This embodiment employs the same structure as that of FIGS. 1-4 except for the flowchart showing the operation of control circuit 5, which is set as shown in FIGS. 6A and 6B.

In response to turning on of the power supply, the system starts to operate. At step 1, location designation initial value i for memory 4 is set to 0. At step 2, a flag F which indicates that button $R_2$ is switched on is reset to its initial state. If recording standby button $R_1$ is then determined as being switched on (at step 3), the following speech and image recording operations will be performed First, the speech recording operation will be described. At step A1, the speech signal information for the last T seconds starts to be stored in location MR(i) (i=0 now) of memory 4. At step A2, it is determined whether or not speech recording button $R_2$ is pushed. If it is pushed, flag F will be set to "1" at step A3. If it is not, it will be determined whether or not recording standby button $R_1$ is switched on at step A9.

If speech recording button $R_2$ is pushed and recording standby button $R_1$ is pushed, steps A1, A2, and A9 will be repeated in loop and the speech data for the last T seconds is updated and stored in location MR(i) (i=0 now) of memory 4.

Under these circumstances, if recording standby button $R_1$ is switched off, the flow will branch from step A9 to step A1 in which case flag F is not "1", so that the flow branches from A10 to A11. If the track which head $H_V$ is accessing is not yet recorded completely, the flow will return from step A11 to step A2. At step A2, when speech recording button $R_2$ is on, the flow goes to A3, as described above, and flag F is set to "1". The location designation initial value i is then incremented by 1 (step A4). At step A5, speech data starts to be stored in a location MR(i) (i=1 now) of memory 4. This storing operation is continued for T seconds and the flow then goes to step A7. At this step, i is further incremented by 1. Execution of steps A5, A6 will cause speech data for T seconds to be stored in memory MR(i) of memory 4.

At steps A3, A7, incrementing the coset for 3, called (MOD 3) is performed.

At step A8, it is then determined whether or not recording standby button $R_1$ is off. If it is off, the flow will go to step A12. If it is not, the flow will return to step A1 to start the storing operation in location MR(i) (i=2 now) of memory 4, and then repeat the steps A1 to A8 in loop.

At step A12, the speech data stored in locations, MR(i−2), MR(i−1) of memory 4 is recorded by head $H_V$ on magnetic sheet S. That is, at step A7, when i=2, a recording is made of the speech data stored in locations MR(0), MR(1), more particularly, the speech data T seconds before recording button $R_2$ is switched on and the data for T seconds after button $R_2$ is switched on.

If recording standby button $R_1$ continues to be on when the flow shifts from step A8 to A1, new speech data will be stored in location MR(2) of memory 4. If recording standby button $R_1$ is switched from on to off with speech recording button $R_2$ being not switched on while speech data is being stored in the location MR(2), the flow will go through steps A1, A2, A9, A10 to A12 where head $H_A$ records the speech data stored in locations MR(2), MR(1) of memory 4, more particularly, the speech data for T seconds before and after the time when speech recording button $R_1$ is switched on (the speech data for the interval from the time when the flow branches from step 3 to step A1 to the time when speech recording button $R_1$ is switched on, and the speech data for T seconds after speech recording button $R_1$ is switched on, if speech recording button $R_1$ is switched on before T seconds has passed after the flow has branched from step 3 to step A1).

If speech recording button $R_2$ is again switched on when the flow branches from step A8 to step A1, the flow will go from step A2 through step A3 to step A4 where location designation initial value i is further incremented by 1 to become 3. It should be noted that in the particular embodiment, i is shown as the coset for 3, as described above, so that actually i=0. Steps A5, A6 are then executed to store in location MR(i) (i=0 now) of memory 4 the speech data for T seconds after speech recording button $R_2$ has been switched on. At step A7, i is incremented by 1. If, after i=1, it is detected that recording standby button $R_1$ is switched on, the flow branches from step A8 to A12 to record the speech data stored in locations MR(i−2), MR(i−1) of memory 4 by head $H_A$. Here the speech data is stored in locations MR(2), MR(0), more particularly, the speech data for T seconds both before and after the second time when speech button $R_2$ is switched on (when speech recording button $R_2$ is switched on before T seconds has passed from the time when the flow branches from step A8 to step A1, the speech data for the interval from the time when the flow branches from step A8 to step A1 to the time when speech recording button $R_2$ is switched on, and the speech data for T seconds after speech recording button $R_2$ is switched on). This flow is repeated each time speech recording button $R_2$ is switched on.

The flow from step V1 to V3 is similar to that from step V1 to V3 of FIGS. 5A and 5B and its explanation will be omitted.

Thus in accordance with the particular embodiment, when speech recording button $R_2$ is switched on while recording standby button $R_1$ is on, the speech data for a predetermined time both before and after the time when standby button $R_2$ is switched on is stored in memory 4 and recorded by head $H_4$ on magnetic sheet S when recording standby button $R_1$ is afterward switched off. When speech recording button $R_2$ is switched on a plurality of times while recording standby button $R_1$ is on, the speech data for T seconds before and after the last time when recording button $R_2$ is switched on is recorded by head $H_4$ on magnetic sheet S.

Thus the speech data can be re-recorded on magnetic sheet S by re-pushing speech recording button $R_2$ while recording standby button $R_1$ is on.

Altering the timing of switching on speech recording button $R_2$ would permit the speech recorded to be set at will.

In the above embodiment, if speech recording button $R_2$ is switched on while recording standby button $R_1$ is on, a recording will be made of the speech data for T seconds after speech recording button $R_2$ has been switched on although recording standby button $R_1$ is switched off.

Figure 7B:
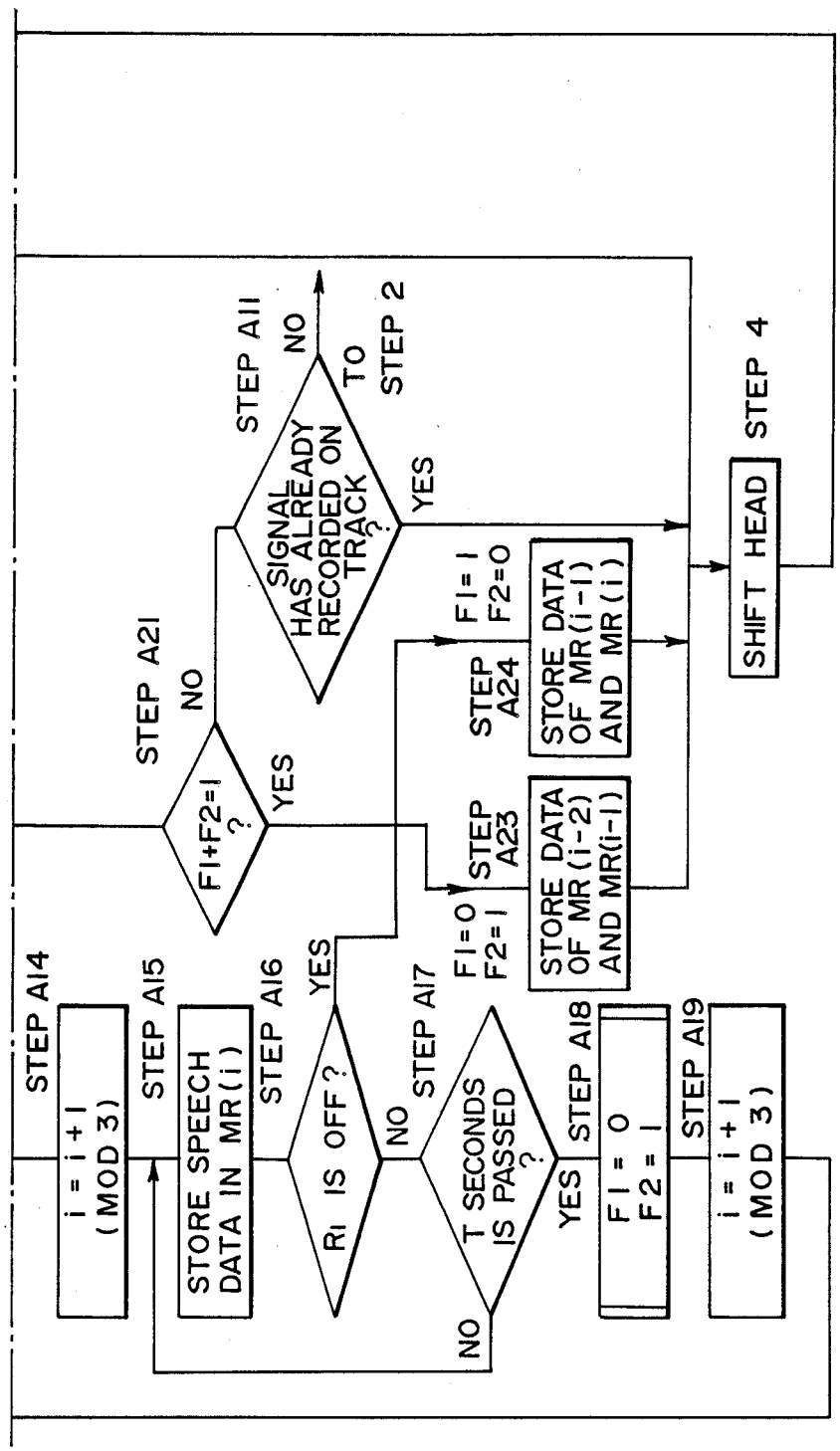

If recording standby button $R_1$ is before recording of the speech data for T seconds is completed after speech recording button $R_2$ is switched on, a further recording of the speech data for the T seconds will not be made whereas the speech data for the T seconds will be recorded only if recording button $R_1$ is not switched off. This will now be described with respect to FIGS. 7A and 7B which is similar to FIGS. 6A and 6B. In FIGS. 7A and 7B, steps 1 to 4, 11, steps A1, A2, and steps V1 to V3 are similar to those having corresponding reference symbols of FIGS. 6A and 6B and will not be described further. Step 2' of FIG. 7A functions to reset flags F1, F2 together.

In the particular embodiment, flag F1 is set and F2 is reset at step A13 when speech recording button $R_2$ is switched on while speech data for T seconds is being stored in location MR(i) (i=0 now) of memory 4 after recording standby button $R_1$ is switched on. At step A14, location designation initial value i is incremented by 1, as in step A6 of FIG. 6B. Execution of steps A15, A16, A17 causes the speech data for the T seconds to be stored in location MR(i) (i=1 now) of memory 4.

If should be noted that since, in the particular embodiment, step A16 is provided, the flow branches from step A16 to step A24 when recording standby button $R_1$ is switched on while steps A15, A16, A17 are being executed.

In such case, since, at step A24, i=1 now in locations MR(i−1), MR(i) of memory 4, the data in locations MR(0), MR(1) of memory 4 is recorded by head $H_4$.

Consequently, when recording standby button $R_1$ is switched off before T seconds passes from the time when speech recording button $R_2$ is switched on after recording standby button $R_1$ has been switched on, the speech data stored in memory 4 before speech recording button $R_2$ is switched on will be recorded by head $H_4$ on magnetic sheet S. The speech data after recording standby button $R_1$ is switched off will not be recorded on magnetic sheet S.

Thus in the recording apparatus of the particular embodiment, an amount of speech data to be recorded on magnetic sheet S can be controlled by the user switching off recording standby button $R_1$ before the predetermined time passes after speech recording button $R_2$ has been switched on.

When T seconds has passed with recording standby button $R_1$ being not switched off while steps A15 to A17 are being repeated, the flow branches from step A17 to A18 to reset flag F1 and set flag F2. Location designation initial value i is then incremented by 1 to become 2 and then the flow returns to step A1.

Subsequently, when the flow goes through step A1 to step A2, and if speech recording button $R_2$ is not switched on at step A2, the flow will branch to step A20. When recording standby button $R_1$ is determined to be switched off at step A20, the flow goes from step A20 to A21. In such case, flag F2 is set and flag F1 is reset, so that the flow branches from step A21 to step A23 where the data in locations MR(0), MR(1) of memory 4 is recorded on magnetic sheet S.

In accordance with the particular embodiment, as just described, the speech data is stored in memory 4 by switching on speech recording button $R_2$ after recording standby button $R_1$ is switched on, and then the speech data stored in memory 4 can be immediately recorded on the magnetic sheet by switching off recording standby button $R_1$. In addition, as in the embodiment shown in FIGS. 6A and 6B, if speech recording button $R_2$ is switched on while recording standby button $R_1$ is on, and if the recording standby button $R_1$ is switched off in a predetermined time, the speech data present after recording standby button $R_1$ is switched on will not be recorded on the magnetic sheet, but only the speech data before recording standby button $R_1$ is switched on will be recorded on the magnetic sheet, which is an advantage of the particular embodiment.

Another embodiment on recording standby button $R_1$, speech recording button $R_2$, and image recording button $R_3$ will now be described using FIG. 8, which is a perspective view of the embodiment on the buttons $R_1$ to $R_3$, showing the structure thereof. In FIG. 8, reference numeral 15 denotes an electrostatic capacity detecting circuit which detects the electrostatic capacity of an operation button 18 in the recording apparatus and which if the electrostatic capacity of the operating button is changed due to the operator finger touching the operating button, will input to control circuit 5 a signal similar to the signal produced when recording standby button R shown in FIG. 2 is switched on. Reference numeral 19 denotes a movable contact moved in response to a pressing of operating button 18. Reference numeral 20 denotes a contact which contacts with movable contact 19 when same is pressed through a first stroke Contacts 19, 20 can be grounded via resistance. Contact 20 is connected with the power supply. Signals from contacts 19 and 20 are input as signals from speech and image recording buttons $R_2$ and $R_3$, respectively, to control circuit 5.

Accordingly, the arrangement of buttons $R_1$ to $R_3$ in the particular embodiment is such that pressing of operating button 18 through the first stroke causes a speech signal to be stored, a further pressing of the operating button through a second stroke causes an image signal to be recorded on the magnetic sheet, and releasing of the operating button causes the speech signal stored in memory 4 to be recorded on the magnetic sheet, which improves the operability of the apparatus greatly.

Of course, an alternative embodiment may have a switching structure in which three different signals are transmitted to control circuit 5 in response to the respective different strokes of operating button 18.

What is claimed is:

1. A recording apparatus which is capable of storing a video signal and an audio signal together on a recording medium, comprising:
   (a) a memory for storing an audio signal generated during a predetermined time;
   (b) recording means for recording on said recording medium the audio signal stored in said memory and the video signal; and
   (c) manually operating means for causing said recording means to record the audio signal stored in said memory and the video signal, said manually operating means including;
   (A) a first triggering switch, having a first state and a second state, for causing said recording means to record the video signal on said recording medium in said second state;
   (B) a second triggering switch, having a first state and a second state, for causing an audio signal to be stored in said memory in said second state; and
   (C) a third trigger switch, having a first state and a second state, for updating said audio signal stored in said memory by a new audio signal before recording the audio signal on said recording medium; and
   said manually operating means comprising a single operating member which operates the states of said three switches.

2. A recording apparatus according to claim 1, wherein said manually operating means includes means for activating said recording means to operate when said second triggering switch changes from the second state thereof to the first state thereof to record the audio signal stored in said memory on said recording medium.

3. A recording apparatus according to claim 1, wherein said memory includes means for storing an audio signal for the latest predetermined time after said second triggering switch changes its state from the first state thereof to the second state.

4. An apparatus used in a recording system which records at least two kinds of information, comprising:
   storage means for storing information;
   means for setting a stand-by mode for storing information in said storage means;
   a single operating member having a first operating state, and a second operating state; and
   control means for causing said storage means to operate only when said stand-by mode is set by said setting means so that a first kind of information is stored in said storage means in response to said first operating state of said single operating member and a second kind of information different from said first kind of information is stored in said storage means in response to said second operating state of said single operating member independently of storing the first information, said control means randomly storing said first kind of information and said second kind of information in said storage means respectively.

5. An apparatus for a recording system according to claim 4, wherein said single operating member having a third operating state which differs from said first and second operating states, and said setting means detects said third operating state of said single operating member and sets said standby-mode.

6. An apparatus for a recording system according to claim 4, wherein said first operating state includes a state in which said operating member is pushed in through a first stroke.

7. An apparatus for a recording system according to claim 6, wherein said second operating state includes a state in which said operating member is pushed in through a second stroke.

8. An apparatus for recording system according to claim 6, wherein said third operating state includes a state in which said operating member is touched by an operator.

9. An apparatus for a recording system according to claim 4, wherein said first kind of information includes information corresponding to speech.

10. An apparatus for a recording system according to claim 9, wherein said second kind of information includes information corresponding to an image.

* * * * *